United States Patent [19]

Thorp, II, deceased

[11] 3,941,653

[45] Mar. 2, 1976

[54] CONTROL ROD DRIVE SHAFT LATCH

[75] Inventor: Arthur G. Thorp, II, deceased, late of Pittsburgh, Pa., by Ruth S. Thorp, administratrix

[73] Assignee: Westinghouse Electric Corporation, Pittsburgh, Pa.

[22] Filed: Oct. 5, 1971

[21] Appl. No.: 186,616

Related U.S. Application Data

[63] Continuation of Ser. No. 712,338, March 8, 1968, abandoned.

[52] U.S. Cl. ................................ 176/36 R; 92/24
[51] Int. Cl. ............................................. G21c 7/00
[58] Field of Search ........... 176/36 R, 36 SA, 36 C, 176/35; 92/24; 310/12-14

[56] References Cited
UNITED STATES PATENTS

| | | |
|---|---|---|
| 3,020,887 | 2/1962 | Hobson et al. ........................ 176/36 |
| 3,020,888 | 2/1962 | Braun ..................... 176/36 |
| 3,050,943 | 8/1962 | Thorel et al. ......................... 176/36 |
| 3,162,796 | 12/1964 | Schreiber et al. ..................... 176/36 |
| 3,251,278 | 5/1966 | Royster .................................. 92/24 |
| 3,347,748 | 10/1967 | Olsson .................................. 176/36 |

FOREIGN PATENTS OR APPLICATIONS 910,203   11/1962   United Kingdom ................. 176/36

*Primary Examiner*—Harvey E. Behrend
*Attorney, Agent, or Firm*—Z. L. Dermer

[57] ABSTRACT

A latch mechanism is operated by differential pressure on a piston to engage the drive shaft for a control rod in a nuclear reactor, thereby preventing the control rod from being ejected from the reactor in case of failure of the control rod drive mechanism housing which is subjected to the internal pressure in the reactor vessel.

6 Claims, 4 Drawing Figures

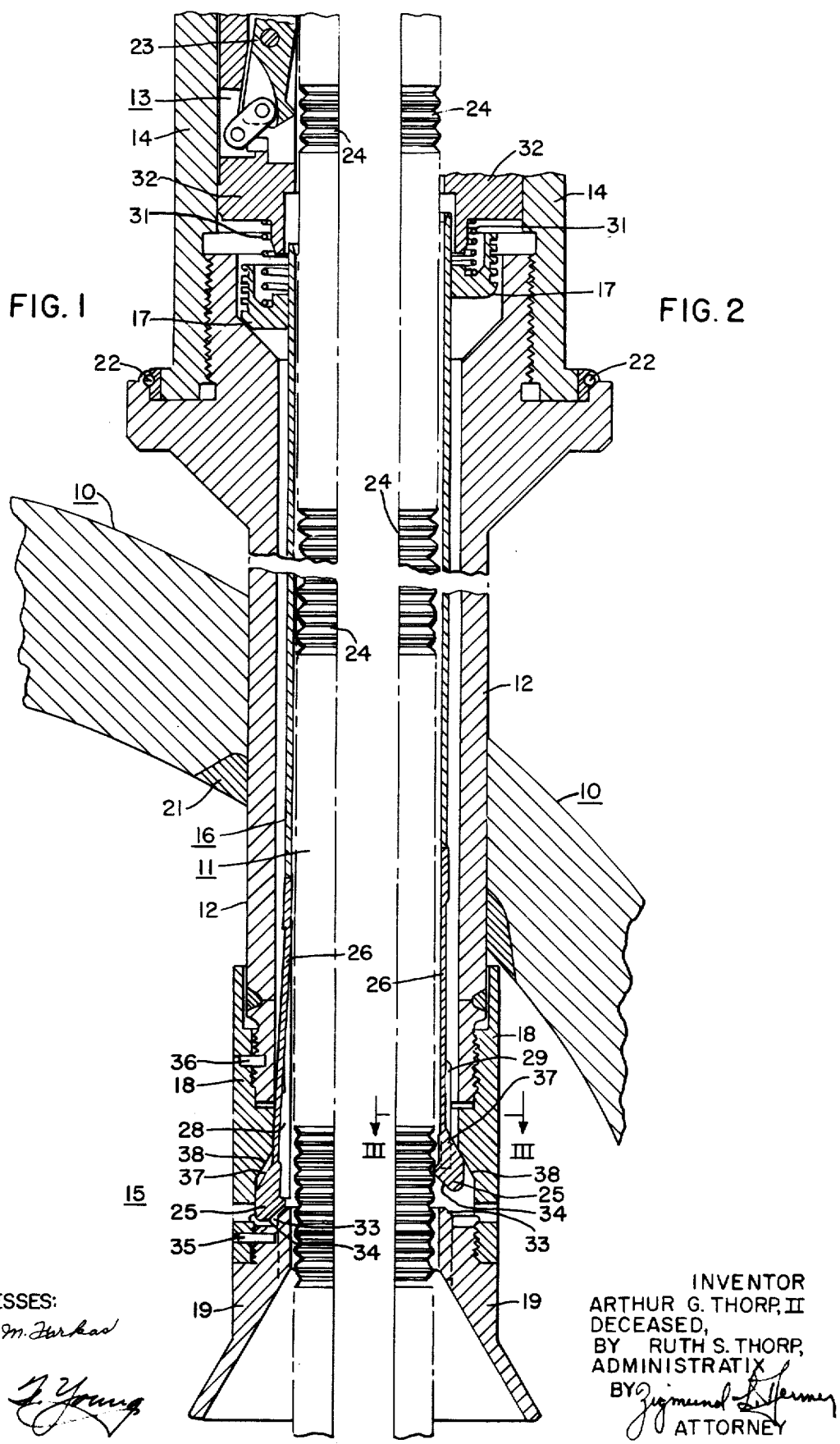

3,941,653

CONTROL ROD DRIVE SHAFT LATCH

This is a continuation, of application Ser. No. 712,338 filed Mar. 8, 1968, now abandoned.

BACKGROUND OF THE INVENTION

This invention relates, generally, to nuclear reactors and, more particularly, to latch devices for mechanisms for driving the control rods for a nuclear reactor.

In a control rod drive mechanism of a type in which the mechanism housing is subjected to the relatively high pressure inside the reactor vessel there is a remote possibility that a failure of the mechanism housing which would release the pressure would cause the control rod to be ejected from the reactor vessel at a relatively high speed by the resulting pressure difference on the control rod drive shaft. The consequences of such an ejection could be extremely severe.

An object of this invention is to eliminate the possibility of control rod ejection from a nuclear reactor vessel.

Another object of the invention is to provide a latch device which operates at a high rate of speed to restrain the control rod drive shaft and the control rod from ejecting from the reactor core, thereby preventing a nuclear excursion.

SUMMARY OF THE INVENTION

In accordance with one embodiment of the invention, a piston is actuated by differential pressure in case of a failure of a nuclear reactor control rod drive mechanism housing to operate a latch device to engage the control rod drive shaft to prevent upward motion of the drive shaft and attached control rod. The piston is attached to the upper end of a longitudinally movable sleeve which surrounds the drive shaft, and latch members at the lower end of the sleeve are forced radially inwardly by cam surfaces on a stationary support tube to engage the drive shaft when the movable sleeve is driven upwardly by differential pressure on the piston.

BRIEF DESCRIPTION OF THE DRAWING

For a better understanding of the nature and objects of the invention, reference may be made to the following detailed description, taken in conjunction with the accompanying drawings, in which:

FIG. 1 is a view, in longitudinal section, of a portion of a control rod drive mechanism with a latch device embodying principal features of the invention, the latch device being in the normal or released position;

FIG. 2 is a view, similar to FIG. 1, showing the latch device in the engaged position;

DESCRIPTION OF THE PREFERRED EMBODIMENT

Figure 3:
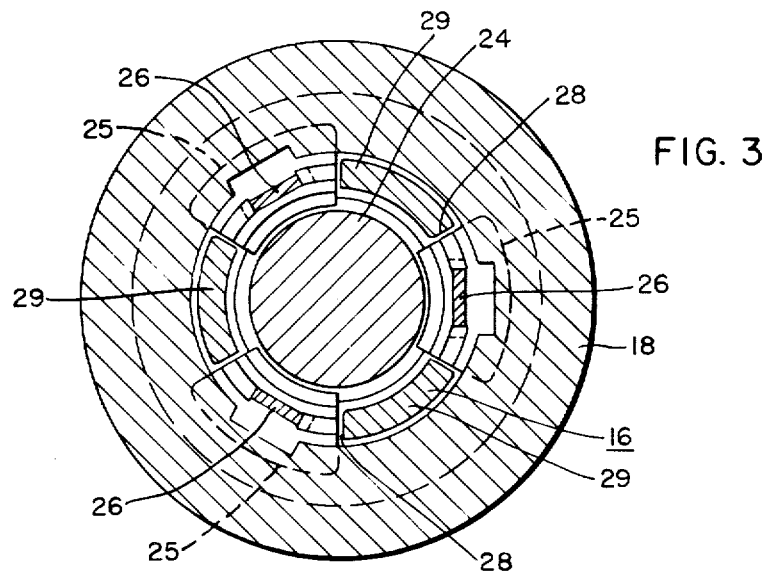
FIG. 3 is an enlarged view, in section, taken along the line III—III in FIG. 2.

Referring to FIGS. 1 and 2 of the drawing, the structure shown therein comprises a portion of a head 10 for a nuclear reactor vessel, a longitudinally movable control rod drive shaft 11 disposed inside a generally cylindrical head adapter 12 which extends through the head 10, a portion of a control rod drive mechanism 13 disposed inside a sealed tubular housing 14, a latch device 15 disposed at the lower end of a longitudinally movable sleeve 16 which surrounds the drive shaft 11, a piston 17 attached to the sleeve 16 at its upper end, a stationary support tube 18 attached to the lower end of the head adapter 12, and a flared extension 19 attached to the lower end of the support tube 18. The reactor vessel, which is not shown with the exception of a portion of the head 10, is of a type suitable for containing a reactor of the pressurized liquid type and is capable of withstanding a relatively high internal pressure.

As shown, the head adapter 12 is hermetically sealed in the head 10 by welding at 21. Likewise, the housing 14 for the control rod drive mechanism is hermetically sealed in the upper end of the head adapter as by welding at 22. The upper end of the tubular housing 14 is also hermetically sealed in a suitable manner. Thus, the housing 14 is subjected to the relatively high internal pressure in the reactor vessel.

The control rod drive mechanism 13, only a portion of which is shown, may be of the type fully described in U.S. Pat. No. 3,158,766, issued Nov. 24, 1964 to E. Frisch and assigned to the Westinghouse Electric Corporation. Briefly, the mechanism comprises a plurality of gripper arms 23 which engage circumferential teeth 24 on the drive shaft 11 to move the drive shaft incrementally either upwardly or downwardly when the gripper arms are actuated by sequentially energized solenoid devices in the manner described in the aforesaid patent.

Figure 4:
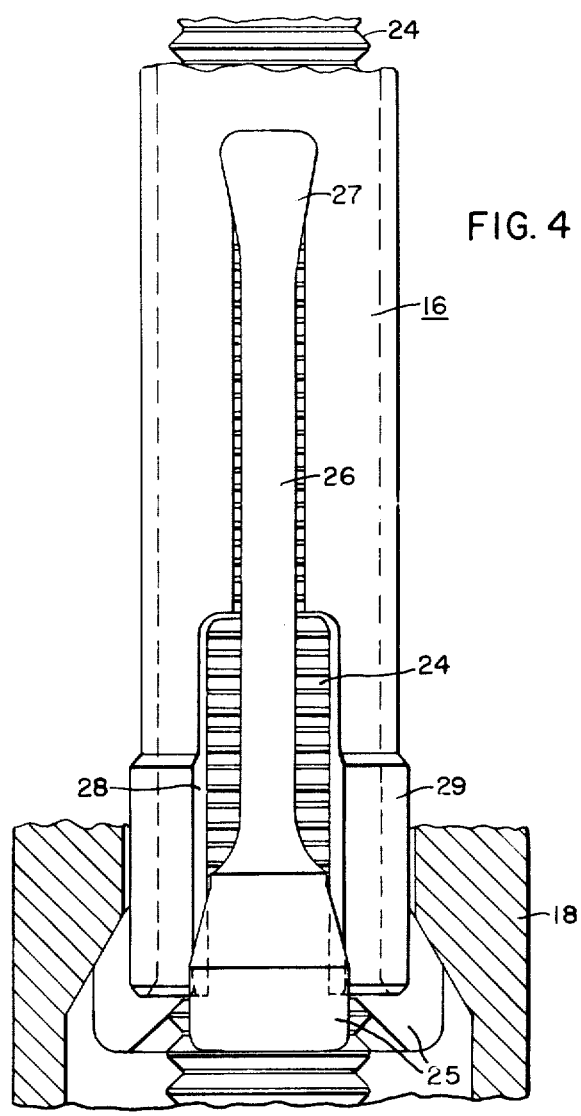
FIG. 4 is an enlarged detail view, looking in the direction indicated by the line IV—IV in FIG. 3, showing one of the latch members.

As explained hereinbefore, there is a remote possibility of a failure or rupture in the housing 14 for the control rod drive maehcnaim, in which case the drive shaft 11 and the control rod (not shown) which is attached to the lower end of the shaft 11 would be forceably ejected from the reactor vessel by the high pressure inside the vessel. In order to eliminate the possibility of such ejection, the latch device 15 is provided. As shown more clearly in FIGS. 3 and 4, the latch device 15 comprises three latch members 25 equally spaced around the drive shaft 11 to engage the teeth 24 on the drive shaft. Each latch member 25 is carried by a flexure arm 26 the upper end of which is secured to the sleeve 16 as by welding at 27. The arm 26 is disposed in a slot 28 between guide portions 29 on the sleeve 16.

As shown in FIG. 1 the piston 17 is biased downwardly by a spring 31 disposed between the upper side of the piston and an annular member 32 fixed in the housing 14 of the control rod drive mechanism. Since the fluid pressure on both sides of the piston 17 is normally balanced, the spring 31 normally maintains the sleeve 16 and the latch members 25 carried by the sleeve in their lowermost position shown in FIG. 1. In this position the members 25 are disengaged from the drive shaft 11 by the action of the flexure arms 26 and by cam surfaces 33 and 34 on the extension 19 and the members 25, respectively. The extension 19 is threaded into the lower end of the support tube 18 and retained therein by a pin 35. Likewise, the tube 18 is threaded onto the lower end of the head adapter 12 and retained thereon by a pin 36.

In case of a failure or rupture in the control rod drive mechanism housing 14, the pressure above the piston 17 is released and the differential pressure on the piston actuates it and the sleeve 16 to the position shown in FIG. 2. The upward movement of the sleeve 16 causes cam surfaces 37 on the latch members 25 to contact cam surfaces 38 on the support tube 18, thereby engaging the latch members 25 with the teeth 24 to prevent the ejection of the drive shaft 11 and the control rod attached to the drive shaft from the reactor vessel.

Since the piston 17 on the sleeve 16 and the drive shaft 11 are subjected to the same pressure differential, the rate at which the sleeve moves to force the latch members 25 radially inwardly to engage the drive shaft, relative to the rate at which the control rod drive shaft moves is governed by the relative force-to-mass ratios. By utilizing the maximum piston area available, the acceleration rate of the sleeve may be made a factor of 10 to 30 times higher than that of the control rod drive shaft, thereby assuring engagement of the latch members with the teeth on the drive shaft before significant rod motion can occur.

From the foregoing description it is apparent that the invention provides a pressure differentially operated latch device which prevents the ejection of a control rod from a reactor vessel as the result of a failure or rupture in the control rod drive mechanism housing which is subjected to the internal pressure in the reactor vessel. The latch device is relatively simple in construction and requires only a small amount of additional space for installation in a nuclear reactor.

Since numerous changes may be made in the abovedescribed construction and different embodiments of the invention may be made without departing from the spirit and scope thereof, it is intended that all subject matter contained in the foregoing description or shown in the accompanying drawings shall be interpreted as illustrative and not in a limiting sense.

I claim:

1. In a nuclear reactor, in combination, a reactor vessel having a relatively high internal pressure, a longitudinally movable control rod drive shaft, a control rod drive mechanism disposed externally of the reactor vessel, sealed housing means for the mechanism having substantially the entire interior thereof open to the interior of said vessel so as to be subjected to the internal pressure in the reactor vessel, motive means for moving the drive shaft longitudinally and incrementally, a latch device positioned adjacent to and movable into and out of engagement with said drive shaft and mounted on a support to prevent movement of said control rod shaft when in engagement therewith, said latch device being positioned out of engagement with the control rod drive shaft when said housing means is sealed, cam surfaces fixedly positioned with respect to the housing and complementary cam surfaces on said latch device movable into engagement with said fixed cam surfaces to move said latch device into engagement with said drive shaft, and movable differential pressure responsive means having opposed sides and located in said housing means adjacent the area of joinder of said housing and said vessel, said last-mentioned differential pressure means being coupled to said latch device and exposed to said internal pressure, said differential pressure means being positioned within said housing with said pressure on opposed sides of said differential pressure means being balanced when said housing means is sealed such that said latch device is out of engagement with said drive shaft yet becomes unbalanced in the event of a break in said housing means at a location on the side of said differential pressure means remote from said vessel and moves in response to said unbalance to engage said fixed and complementary cam surfaces and thereby engage the latch device with the drive shaft.

2. The combination defined in claim 1, including spring means biasing the latch device to the disengaged position.

3. The combination defined in claim 1, including a longitudinally movable sleeve located in said housing surrounding the drive shaft and having the differential pressure means attached at its upper end, the latch device including latch members spaced around the drive shaft at the lower end of the sleeve.

4. The combination defined in claim 3, wherein the latch members are carried by flexure arms on said sleeve.

5. The combination defined in claim 3, including a stationary support tube inside the reactor vessel, and said fixed cam surfaces mounted on said tube.

6. The combination defined in claim 3, wherein the reactor vessel has a head and the sleeve extends through the head with the differential pressure means disposed externally of the vessel and the latch members disposed internally of the vessel.

* * * * *